(12) United States Patent

Dang et al.

(10) Patent No.: US 12,698,796 B2

(45) Date of Patent: Aug. 4, 2026

(54) MECHANICAL JOINTS AND PROCESS FOR USING SAME

(71) Applicant: MODEC AMERICA, INC., Houston, TX (US)

(72) Inventors: Quoc Anh Dang, Cypress, TX (US); David M. Seaman, Waller, TX (US); Alan R. Cordy, Katy, TX (US); Jean-Benoit Lega, Sugar Land, TX (US)

(73) Assignee: MODEC AMERICA, INC., Houston, TX (US)

( * ) Notice: Subject to any disclaimer, the term of this patent is extended or adjusted under 35 U.S.C. 154(b) by 284 days.

(21) Appl. No.: 18/347,419

(22) Filed: Jul. 5, 2023

(65) Prior Publication Data

US 2024/0011524 A1 Jan. 11, 2024

Related U.S. Application Data

(60) Provisional application No. 63/358,738, filed on Jul. 6, 2022.

(51) Int. Cl.
F16C 11/06 (2006.01)
F16C 11/02 (2006.01)
B63B 21/04 (2006.01)

(52) U.S. Cl.
CPC .......... F16C 11/0642 (2013.01); F16C 11/02 (2013.01); F16C 11/0604 (2013.01); F16C 11/0633 (2013.01); B63B 21/04 (2013.01)

(58) Field of Classification Search
CPC ..... F16C 11/02; F16C 11/045; F16C 11/0604; F16C 11/0609; F16C 11/0628;

(Continued)

(56) References Cited

U.S. PATENT DOCUMENTS 4,455,108 A * 6/1984 Lausberg .............. B63B 21/502
285/94
4,768,895 A * 9/1988 Ludwig ............... F16C 11/0619
403/77

(Continued)

FOREIGN PATENT DOCUMENTS

FR 3018063 A1 9/2015
GB 2092664 A 8/1982
WO WO-2018198109 A1 * 11/2018 .............. F16C 17/04

OTHER PUBLICATIONS

Translated Description of FR-3018063. Perratone, Rene. Chain Stopper for a Floating Unit and Associated Anchoring System for a Floating Unit. Sep. 4, 2015.*

(Continued)

*Primary Examiner* — Amber R Anderson
*Assistant Examiner* — Kevin J Baynes
(74) *Attorney, Agent, or Firm* — Edmonds & Cmaidalka, P.C

(57) ABSTRACT

Mechanical joints and processes for using same. The mechanical joint can be configured to provide an articulated connection between a first member and a second member. In some embodiments, the mechanical joint can include a support member and an arm. The support member can define an aperture therethrough and a socket on an inner surface thereof. The arm can include a ball disposed on a first end thereof that can be engaged within and supported by the socket defined by the support member. A second end of the arm can extend through the aperture of the support member such that the arm can rotate relative to the support member about a longitudinal axis of the arm and at least partially rotate about two axes that pass through a center point of the ball that are perpendicular to one another and to the longitudinal axis of the arm.

20 Claims, 8 Drawing Sheets

(58) Field of Classification Search
CPC .............. F16C 11/0633; F16C 11/0642; F16C
11/0695; B63B 21/004; Y10T 403/32122;
Y10T 403/32786; Y10T 403/32795; Y10T
403/32803
See application file for complete search history.

(56) References Cited

U.S. PATENT DOCUMENTS

| | | | | |
|---|---|---|---|---|
| 5,112,153 A | | 5/1992 | Gunn et al. | |
| 5,372,446 A | * | 12/1994 | Chamberlin | F16C 11/069 |
| | | | | D25/61 |
| 5,409,320 A | * | 4/1995 | Maury | B60G 7/005 |
| | | | | 403/77 |
| 6,152,641 A | * | 11/2000 | Rabe | F16C 11/0671 |
| | | | | 403/50 |
| 7,097,381 B2 | * | 8/2006 | Sieve | B60G 21/0551 |
| | | | | 403/123 |
| 7,325,508 B2 | * | 2/2008 | Boatman | B63B 21/10 |
| | | | | 114/200 |
| 7,926,436 B2 | * | 4/2011 | Boatman | B63B 21/04 |
| | | | | 114/200 |
| 8,770,039 B2 | * | 7/2014 | Dang | G01L 5/101 |
| | | | | 73/828 |
| 9,199,697 B2 | * | 12/2015 | Dang | B63B 21/10 |
| 9,309,919 B2 | * | 4/2016 | Staade | B60G 7/005 |
| 10,132,347 B2 | * | 11/2018 | Armiento | F16C 11/0623 |
| 10,634,185 B2 | * | 4/2020 | Bucking | F16C 11/08 |
| 2013/0149026 A1 | * | 6/2013 | Fu | G06F 1/185 |
| | | | | 403/289 |
| 2017/0008558 A1 | * | 1/2017 | Krüger | F16C 11/0695 |

OTHER PUBLICATIONS

International Search Report and Written Opinion of the International Searching Authority dated Nov. 8, 2023, for PCT/US2023/069654.

* cited by examiner

MECHANICAL JOINTS AND PROCESS FOR USING SAME

CROSS-REFERENCE TO RELATED APPLICATION

This application claims priority to U.S. Provisional Patent Application No. 63/358,738, filed on Jul. 6, 2022, which is incorporated by reference herein.

FIELD

Embodiments described generally relate to mechanical joints. More particularly, such embodiments related to mechanical joints for use in connecting a first member to a second member, e.g., for connecting a mooring leg to a floating body at an offshore site.

BACKGROUND

In the offshore energy industry, it is often necessary or desirable to have two members mechanically linked to one another in a manner that allows articulation of a first member relative to a second member about two axes that are not parallel while simultaneously transmitting loads from the first member to the second member. This is typically accomplished with a mechanical joint. In one example, chain mooring legs can be attached to a floating body via a mechanical joint assembly that is configured to limit out of plane bending of the chain mooring legs. In another example, u-joints can be used to connect a vessel support structure to a yoke in an offshore mooring system. These mechanical joints, however, tend to be large, expensive, and difficult to handle.

There is a need, therefore, for improved mechanical joints and processes for using same.

SUMMARY

Mechanical joints configured to provide an articulated connection between a first member and a second member and processes for using same are provided. In some embodiments, the mechanical joint can include a support member and an arm. The support member can define an aperture therethrough and a socket on an inner surface thereof. The arm can include a ball disposed on a first end thereof that can be engaged within and supported by the socket defined by the support member. A second end of the arm can extend through the aperture of the support member such that the arm can rotate relative to the support member about a longitudinal axis of the arm and at least partially rotate about two axes that pass through a center point of the ball that are perpendicular to one another and to the longitudinal axis of the arm.

In other embodiments, the mechanical joint can include a support member, an arm, and a ball. The support member can define an aperture therethrough and a socket on an inner surface thereof. The arm can include a first end and a second end. The ball can be connected to the arm toward or at the first end thereof. The ball can be engaged within and supported by the socket defined by the support member. The second end of the arm can be configured to extend through the aperture defined by the support member such that the arm and ball can rotate about a longitudinal axis of the arm and at least partially rotate about two axes that pass through a center point of the ball that are perpendicular to one another and to the longitudinal axis of the arm.

In some embodiments, a process for rotating a second member relative to a first member, where the second member is connected to the first member via a mechanical joint, can include deploying a tool to the mechanical joint. The mechanical joint can include a support member and an arm. The support member can define an aperture therethrough and a socket on an inner surface thereof. The arm can include a ball disposed on a first end thereof engaged within and supported by the socket defined by the support member. A second end of the arm can extend through the aperture of the support member such that the arm can rotate relative to the support member about a longitudinal axis of the arm and at least partially rotate about two axes that pass through a center point of the ball that are perpendicular to one another and to the longitudinal axis of the arm. The ball can define a profile configured to receive a tool. The process can also include engaging the profile defined by the ball with the tool. The process can also include applying a torque to the ball with the tool such that the ball and arm rotate relative to the support member.

BRIEF DESCRIPTION OF THE DRAWINGS

The various aspects and advantages of the preferred embodiment of the present invention will become apparent to those skilled in the art upon an understanding of the following detailed description of the invention, read in light of the accompanying drawings which are made a part of this specification.

DETAILED DESCRIPTION

Figure 1:
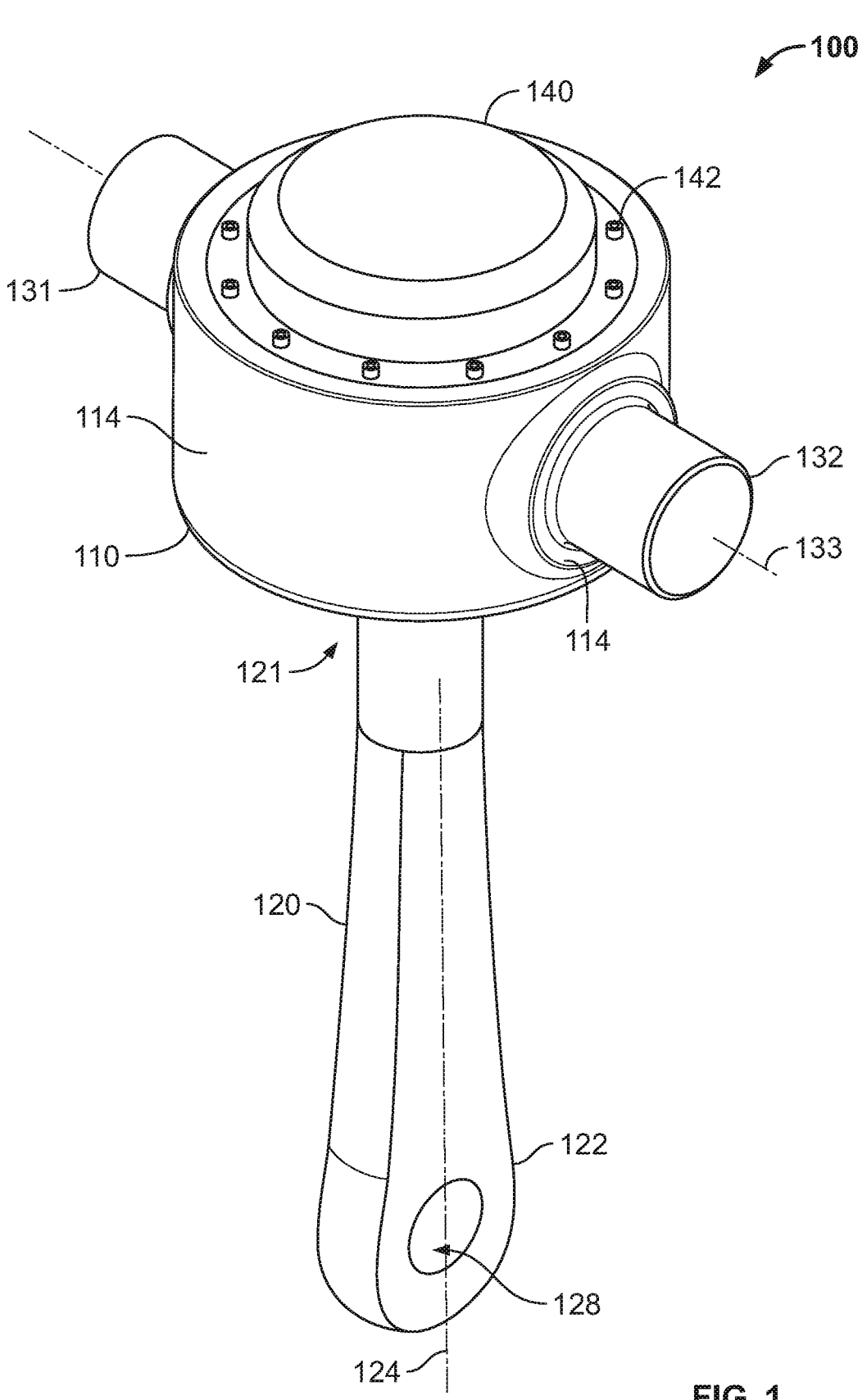
FIG. 1 depicts a perspective view of an illustrative mechanical joint, according to one or more embodiments described.

A detailed description will now be provided. Each of the appended claims defines a separate invention, which for infringement purposes is recognized as including equivalents to the various elements or limitations specified in the claims. Depending on the context, all references to the "invention", in some cases, refer to certain specific or preferred embodiments only. In other cases, references to the "invention" refer to subject matter recited in one or more, but not necessarily all, of the claims. It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the figures provided herein. This repetition is for the purpose of simplicity and clarity and does not in itself dictate a relationship between the various exemplary embodiments and/or configurations discussed in the Figures. Moreover, the formation of a first feature over or on a second feature in the description that follows includes embodiments in which the first and second features are formed in direct contact and also includes embodiments in which additional features are formed interposing the first and second features, such that the first and second features are not in direct contact. The exemplary embodiments presented below may be combined in any combination of ways, i.e., any element from one exemplary embodiment may be used in any other exemplary embodiment, without departing from the scope of the disclosure. The figures are not necessarily drawn to scale and certain features and certain views of the figures can be shown exaggerated in scale or in schematic for clarity and/or conciseness.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Also, the naming convention used herein is not intended to distinguish between components that differ in name but not function. Furthermore, in the following discussion and in the claims, the terms "including" and "comprising" are used in an open-ended fashion, and thus should be interpreted to mean "including, but not limited to."

All numerical values in this disclosure are exact or approximate values ("about") unless otherwise specifically stated. Accordingly, various embodiments of the disclosure may deviate from the numbers, values, and ranges disclosed herein without departing from the intended scope.

Further, the term "or" is intended to encompass both exclusive and inclusive cases, i.e., "A or B" is intended to be synonymous with "at least one of A and B," unless otherwise expressly specified herein. The indefinite articles "a" and "an" refer to both singular forms (i.e., "one") and plural referents (i.e., one or more) unless the context clearly dictates otherwise. The terms "up" and "down"; "upward" and "downward"; "upper" and "lower"; "upwardly" and "downwardly"; "above" and "below"; and other like terms used herein refer to relative positions to one another and are not intended to denote a particular spatial orientation since the apparatus and methods of using the same may be equally effective at various angles or orientations.

It should also be understood that the phrases "disposed therein", "disposed within" and other similar phrases, when describing a component, e.g., an arm or ball, describe the component as being partially disposed therein/within or completely disposed therein/within.

For example, if the component is a ball disposed on the end of an arm that can be disposed within a socket, the phrase "the ball can be disposed within the socket" means the ball can be disposed partially within the socket or completely within the socket.

The terms "rotate", "rotation", "rotatable", and "rotating" mean partial or unlimited rotation of a body about an axis of rotation.

The terms "perpendicular" and "perpendicularly", as used herein, refer to two lines or vectors that are coplanar and, therefore, intersect one another at a 90 degree angle. Further, the term "substantially" when used in the context of "substantially perpendicular" means a first line and a second line are orientated at angles of about 80 degrees, about 83 degrees, about 85 degrees, about 87 degrees, or about 89 degrees to, about 91 degrees, about 93 degrees, about 95 degrees, about 97 degrees, or about 100 degrees with respect to one another.

Figure 2:
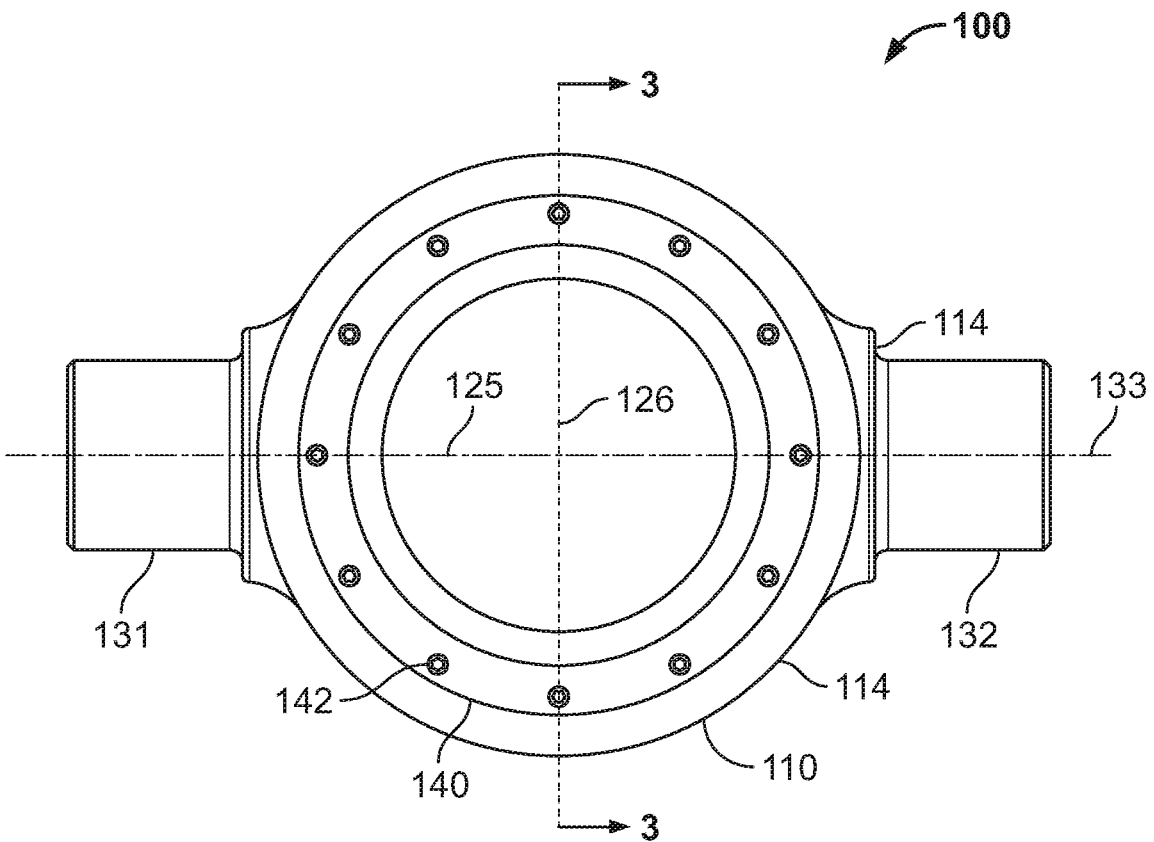
FIG. 2 depicts an end view of the illustrative mechanical joint shown in FIG. 1.
Figure 3:
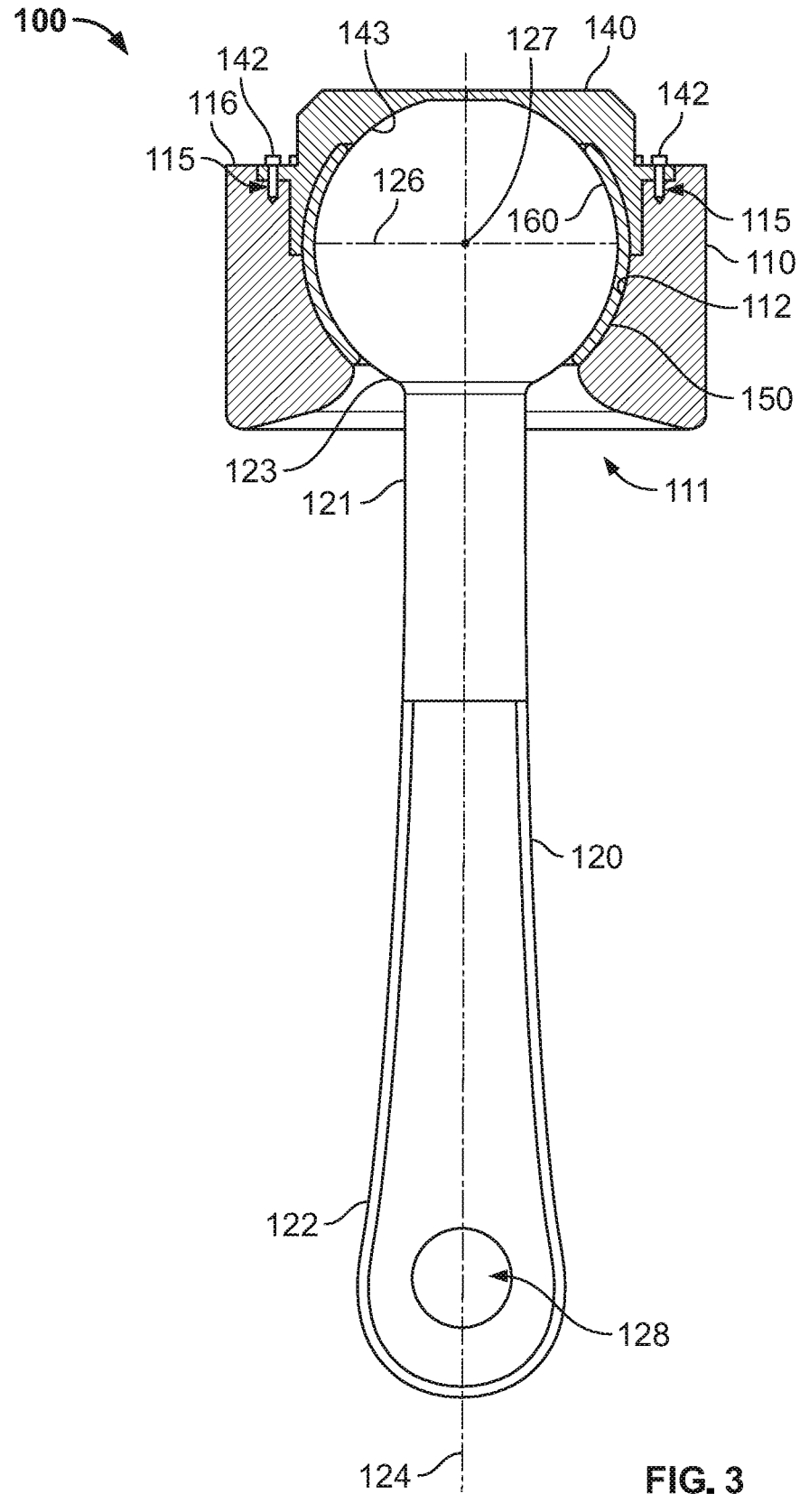
FIG. 3 depicts a cross-sectional view of the illustrative mechanical joint shown in FIGS. 1 and 2 along section line 3-3 (as shown in FIG. 2).
Figure 4:
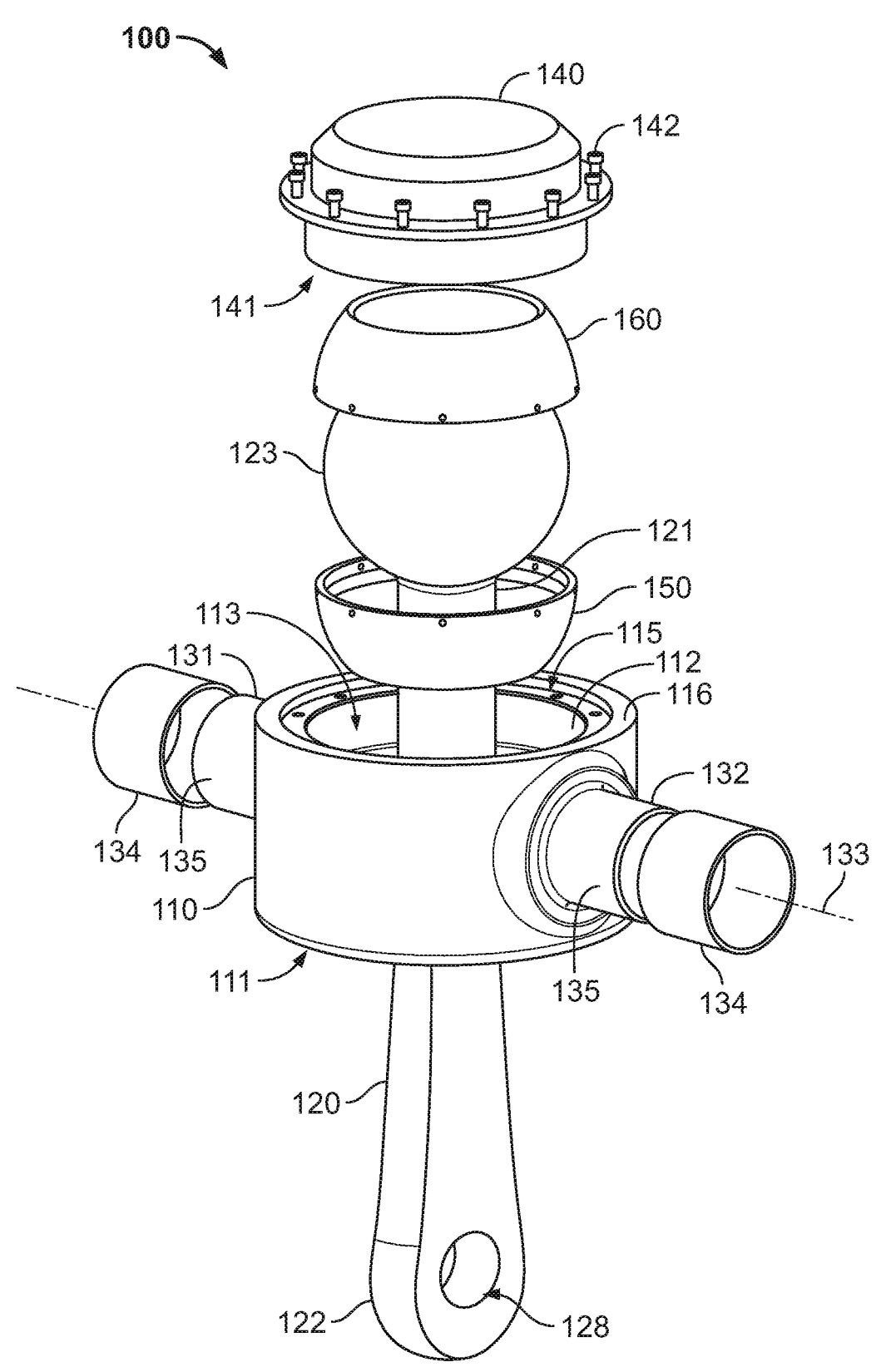
FIG. 4 depicts a perspective, exploded view of the illustrative mechanical joint shown in FIGS. 1 to 3.

FIG. 1 depicts a perspective view of an illustrative mechanical joint 100, according to one or more embodiments. FIG. 2 depicts an end view of the illustrative mechanical joint 100 shown in FIG. 1. FIG. 3 depicts a cross-sectional view of the illustrative mechanical joint shown in FIGS. 1 and 2 along section line 3-3 (as shown in FIG. 2). FIG. 4 depicts a perspective, exploded view of the illustrative mechanical joint shown in FIGS. 1 to 3.

Referring to FIGS. 1-4 collectively, the mechanical joint 100 can be configured to provide an articulated connection between a first member and a second member. The mechanical joint 100 can include a support member 110 and an arm 120 having a first end 121 and a second end 122. The support member 110 can define an aperture 111 therethrough and a socket 113 on an inner surface 112 thereof. In some embodiments, the arm 120 can include a ball 123 disposed on the first end 121 thereof. In other embodiments, the arm 120 can include the ball 123 connected to the arm 120 toward or at the first end 121 thereof. The ball 123 can be engaged within and supported by the socket 113 defined by the support member 110. In some embodiments, the ball 123 can be an integral part of the arm 120. In other embodiments, the ball 123 can be a separate structure. In such embodiment, the ball 123 can be fixedly attached to the arm 120 by welding, bolting, or other method of rigidly fastening the ball 123 to the arm 120.

The second end 122 of the arm 120 can extend through the aperture 111 of the support member 110 such that the arm 120 can rotate relative to the support member 110 about a longitudinal axis 124 of the arm 120 and at least partially rotate about two axes 125, 126 that pass through a center point 127 of the ball 123 that can be perpendicular or substantially perpendicular to one another and can also be perpendicular or substantially perpendicular to the longitudinal axis 124 of the arm 120. In some embodiments, the arm 120 can simultaneously and independently rotate relative to the support member 110 about a longitudinal axis 124 and a first axis 125 and a second axis 126 that can be perpendicular to one another and that can intersect one another at the center point 127 of the ball 123.

In some embodiments, the mechanical joint 100 can also include a pair of trunnions 131, 132. The trunnions 131, 132 can be connected to or disposed on and extend from an exterior surface 114 of the support member 110. In some embodiments, the trunnions 131, 132 can be axially aligned along an axis 133 of the support member 110. As shown in FIG. 2, the axis 133 can be aligned with the axis 125. It should be understood, however, that in other embodiments, the axis 133 can be unaligned with the axis 125.

In some embodiments, each trunnion 131, 132 can be configured as a cylindrical protrusion extending from the outer surface 114 of the support member 110. In some embodiments, the trunnions 131, 132 can be an integral part of the support structure 110. In other embodiments, the trunnions 131, 132 can be a separate structure that can be affixed to the exterior surface 114 of the support structure 110. In such embodiments, the trunnions 131, 132 can be welded, bolted, or otherwise affixed to the exterior surface 114 of the support structure 110. In still other embodiments, the support member 110 can define a pair of axially aligned cylindrical bores on an exterior surface 114 thereof. In such embodiments, the axially aligned cylindrical bores can each be configured to receive a trunnion, pin, or other similar structure that can be supported by the first member such that the support member 110 can be supported by the first member.

The trunnions 131, 132 can be configured to be supported by a corresponding pair of bearing blocks that can be disposed on the first member. In some embodiments, the first member upon which the bearing blocks can be disposed can be, but is not limited to, a floating structure or a stationary structure located in a body of water. In some embodiments, the floating structure can be, but is not limited to, a barge, a ship, a FPSO, a semisubmersible structure, a FSO, a FLNG, a FSRU, a wind platform, a buoy, drill ships, a tension-leg platform or any other floating structure. In some embodiments, the stationary structure can be, but is not limited to, a support tower fixed to a seabed, concrete/gravity platforms, jacket platforms, jack-up rigs, or any other structure.

The trunnions 131, 132 or the pair of axially aligned cylindrical bores together with the trunnions, pins, or other similar structures can be configured such that the support member 110 can rotate about the axis 133 of the support member 110 relative to the first member. In some embodiments the axis 133 of the support member 110 can be a centerline of the support member 110. The centerline can be defined as a line of symmetry of the support member that bisects or is centered between a first side and a second side of the support member 110 that are opposed to one another, i.e., centrally located between two opposed sides of the perimeter and/or centrally located between a top/bottom of the support member 110. In some embodiments, the mechanical joint 100 can rotate up to +/−20 degrees, up to +/−40 degrees, or +/−up to 60 degrees relative to the first member.

In some embodiments, the second end 122 of the arm can define a bore 128 therethrough. The bore 128 can be configured to be secured or otherwise connected to the second member. In some embodiments, the bore 128 can be coupled to the second member via a mechanical connection device such as a shackle, H-link, or other mechanical type connector. In some embodiments, the second member can be, but is not limited to, a flexible or semi-flexible line, e.g., a mooring line, and/or a relatively rigid body, e.g., a link arm. In some embodiments, the flexible or semi-flexible line can be or can include a chain, a cable, a rope, or the like, and/or combinations thereof. In some embodiments, the second member can be a mooring leg, e.g., a chain, a cable, and/or a rope segment. In other embodiments, the second member can be a structural member, and the second end 122 of the arm 120 can be directly welded or mechanically or rigidly fixed to the second member.

In some embodiments, the mechanical joint 100 can also include a closure cap 140. In such embodiments, a first end 116 of the support member 110 can include one or more bores 115 each configured to receive a fastener 142 to secure the closure cap 140 to the support member 110. In some embodiments, the one or more bores 115 can be configured with internal helical threads and the one or more fasteners 142 can be a threaded fastener or cap screw configured to matingly engage with the bore(s) 115. In other embodiments, the first end 116 of the support member 110 can include a plurality of threaded posts extending therefrom that can be configured with external helical threads and a plurality of nuts configured with internal helical threads that can be configured secure the closure cap 140 to the support member 110.

In still other embodiments, the first end of the support member 110 and an outer perimeter of the closure cap 140 can include helical threads configured to be threadedly engaged with one another to secure the closure cap 140 to the support member 110.

In some embodiments, the closure cap 140 can be engaged with the ball 123 such that the ball 123 can be secured within the socket 111 defined by the support member 110. In some embodiments, an inner surface 143 of the closure cap 140 can define a socket 141 that can be configured to engage with the ball 123 such that the ball 123 can be secured within the socket 111 defined by the support member 110 and the socket 141 defined by the inner surface 143 of the closure cap 140.

In some embodiments, the socket 141 defined by the closure cap 140 and the socket 113 defined by the support structure 110 can engage with the ball 123 such that the ball 123 can be prevented from moving in a linear direction with respect to the support structure 110. The ball 123 can transmit lateral and/or axial loads from the support member 110 to the arm 120 and/or from the arm 120 to the support member 110. In some embodiments, the arm 120 and the ball 123 can be free to rotate with respect to the support member 110 about the two axes 125, 126 and can be free to rotate with respect to the longitudinal axis 124 of the arm 120. In some embodiments, the arm 120 and the ball 123 can rotate about the two axes 125, 126 up to +/−10 degrees, up to +/−20 degrees, up to +/−30 degrees, or even up to +/−45 degrees.

In some embodiments, the mechanical joint 100 can include a bushing or first bushing 150. The bushing 150 can be at least partially disposed between the ball 123 and the socket 113 defined by the support structure 110. In some embodiments, the bushing 150 can be constructed or manufactured from a low friction material, for example bronze, a polyethylene material, or a composite material that can include polytetrafluorethylene, for example ORKOT®, or any combination thereof. The bushing 150 can be configured to reduce friction between the ball 123 and the socket 113 and/or to reduce wear and/or to reduce or prevent galling of the ball 123 and/or the socket 113.

In some embodiments, the mechanical joint 100 can include a bushing or second bushing 160. The bushing 160 can be at least partially disposed between the ball 123 and the socket 141 of the closure cap 140. In some embodiments, the second bushing 160 can be constructed or manufactured from a low friction material, for example bronze, a polyethylene material, a composite material that can include polytetrafluorethylene, for example ORKOT®, or any combination thereof. The bushing 160 can be configured to reduce friction between the ball 123 and the socket 141 of the closure cap 140 and/or to reduce wear and/or to prevent galling of the ball 123 or the socket 141. In some embodiments, the ball 123 can be coated with a low friction material. In some embodiments, the socket 113 of the support member 110 and/or the socket 141 of the closure cap 140 can be coated with a low friction coating, such a fluoropolymer coating, for example XYLAN®. In some embodiments the ball 123 can be manufactured from a different material or a material with a different hardness than the inner surface 112 that defines the socket 113 of the support member 110 and the inner surface 143 that defines the socket 141 of the closure cap 140. In some embodiments, the ball 123 can be manufactured from a material that can have a higher hardness or a lower hardness as the inner surface 112 that defines the socket 113 of the support member 110 and/or the inner surface 143 that the defines the socket 141 of the closure cap 140.

In some embodiments, the trunnions 131, 132, the support structure 110, the arm 120, and/or the closure cap 140 can be fabricated, formed, manufactured, or otherwise produced from carbon steel, stainless steel, or other similar materials. The pair of trunnions 131, 132, the support structure 110, the arm 120, and/or the closure cap 140 can independently be castings, forgings, weldments, milled bodies, or any combination thereof. As shown in FIG. 4, in some embodiments, the pair of trunnions 131, 132 can each include a cylindrical bushing 134 disposed on an outer surface 135 of each trunnion 131, 132. The cylindrical bushings 134 can be manufactured from a material such as bronze, a high molecular weight polyurethane, or a low friction material.

Figure 5:
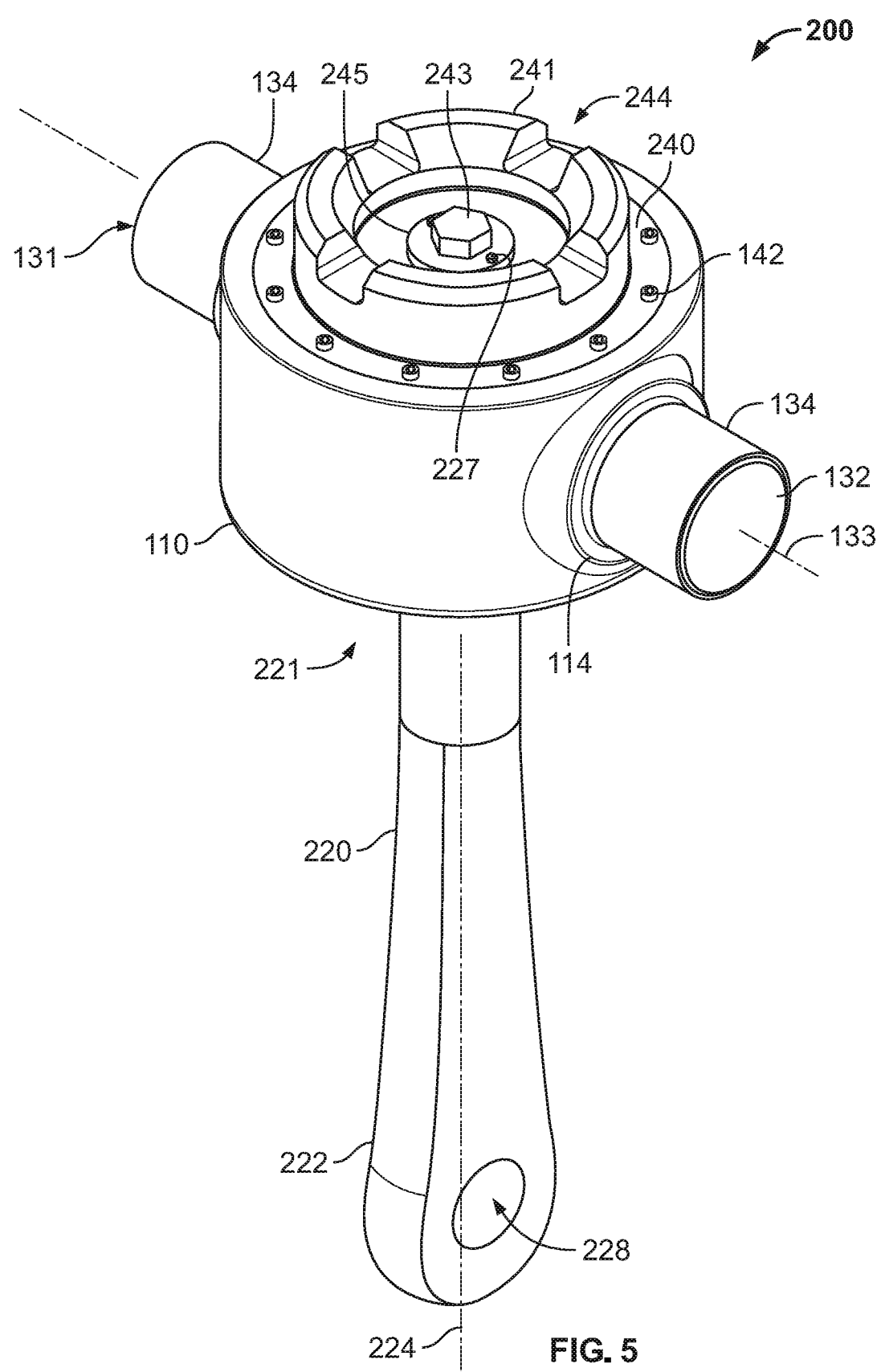
FIG. 5 depicts a perspective view of another illustrative mechanical joint that includes a tool receptacle, according to one or more embodiments described.

FIG. 5 depicts a perspective view of another illustrative mechanical joint 200, according to one or more embodiments. The mechanical joint 200 can be configured to provide an articulated connection between a first member and a second member. The mechanical joint 200 can include the support member 110 and an arm 220 having a first end 221 and a second end 222. The support member 110 can define the aperture 111 therethrough and the socket 113 on an inner surface 112 thereof, as described above with reference to FIGS. 1-4. In some embodiments, the support member 110 can also include the pair of trunnions 131, 132, and, optionally, the bushings 134, as described above with reference to FIGS. 1-4.

Figure 6:
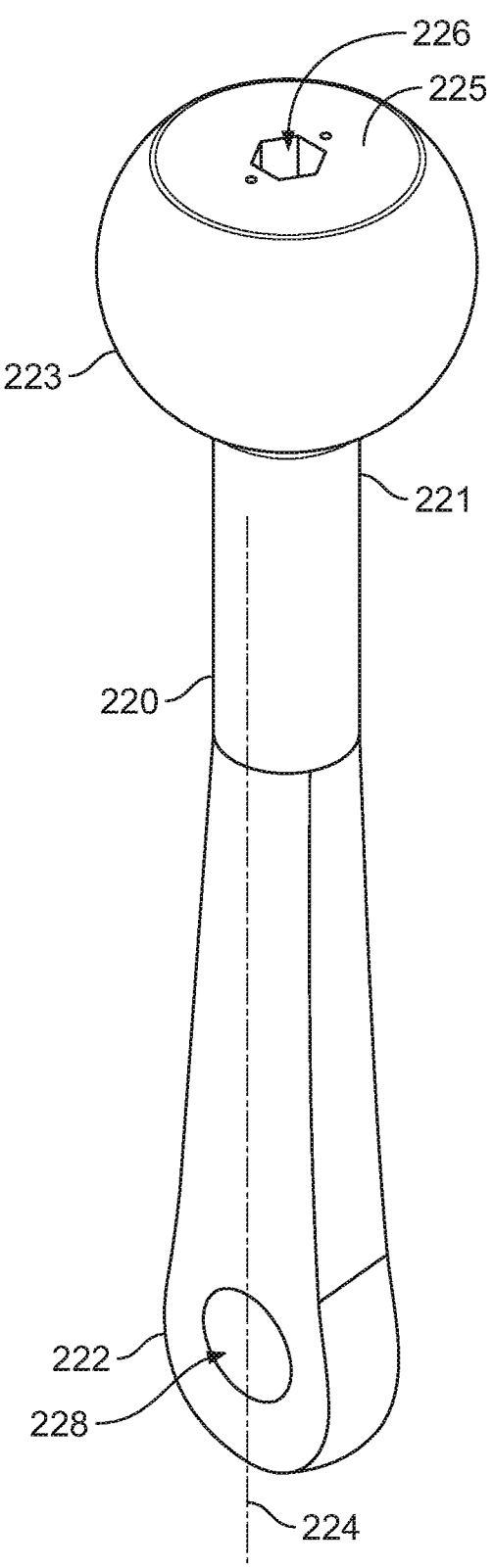
FIG. 6 depicts a perspective view of an arm of the mechanical joint shown in FIG. 5 that includes a profile that can be configured to receive torque applied via a tool, according to one or more embodiments described.

The mechanical joint 200 can also include an arm 220 that can have a first end 221 and a second end 222. FIG. 6 depicts a perspective view of the arm 220 of the mechanical joint shown in FIG. 5. In some embodiments, the arm 220 can include a ball 223 disposed on the first end 221 thereof. In other embodiments, the arm 220 can include the ball 223 connected to the arm 220 toward or at the first end 221 thereof. The ball 223 can be engaged within and supported by the socket 113 defined by the support member 110. In some embodiments, the ball 223 can be an integral part of the arm 220. In other embodiments, the ball 223 can be a separate structure. In some embodiments, the ball 223 can be fixedly attached to the arm 220 by welding, bolting, or other method of rigidly fastening the ball 223 to the arm 220.

The second end 222 of the arm 220 can extend through the aperture 111 of the support member 110 such that the arm 220 can rotate relative to the support member 210 about a longitudinal axis 224 of the arm 220 and at least partially rotate about two axes, e.g., axes 125, 126, as shown in FIG. 2, that pass through a center point 127 of the ball 223, as shown in FIG. 3, that can be perpendicular or substantially perpendicular to one another and can be perpendicular or substantially perpendicular to the longitudinal axis 224 of the arm 220, similar to that shown and described above with reference to FIGS. 1-4. In some embodiments, the arm 220 can simultaneously and independently rotate relative to the support member 110 about the longitudinal axis 224 and a first axis 125 and a second axis 126 that can be perpendicular to one another and that can intersect one another at the center point 127 of the ball 123, as described above with reference to FIGS. 1-4.

In some embodiments the ball 223 can define a flat surface 225. As shown, the flat surface 225 can be located on a side of the ball 223 opposite the arm 220. In some embodiments the ball 223 can define a profile 226 that can be configured to receive torque applied via a tool to the ball 223 to rotate the ball 223 and the arm 220 relative to the support structure 110. In some embodiments, the profile 226 defined by the ball 223 can be, but is not limited to, a threaded cylindrical bore, a slot, a polygonal protrusion, a threaded cylindrical protrusion, or a polygonal indentation (a polygonal indentation is shown in FIG. 6). When the profile 223 receives the torque applied to the ball 223 via the tool, the ball 223 and the arm 220 can rotate about the longitudinal axis 224 of the arm 220. In some embodiments, the arm 220 and the ball 223 can be rotated with respect to the support member 110 while the mechanical joint 200 supports an axial load. In other embodiments, an axial load supported by the mechanical joint 200 can be reduced or eliminated prior to rotating the arm 220 and the ball 223 with respect to the support member 110.

The arm 220 can be fabricated, formed, manufactured, or otherwise produced from carbon steel, stainless steel, or other similar materials. In some embodiments, the arm 220 can be a casting, a forging, a milled body, a weldment, or any combination thereof. In some embodiments, the trunnions 131, 132 can include the cylindrical bushings 134 disposed about an outer surface of each trunnion 131, 132, as described above with reference to FIGS. 1-4.

In some embodiments the mechanical joint 200 can include an extension arm 243. The extension arm 243 can have a first end that can matingly engage with the profile 226 of the ball 223 and a second end that can be configured with a profile or shape configured to receive or otherwise engage with the tool. The extension arm 243 can be configured to transmit a torque from the tool to the profile 226 defined by the ball 223 to rotate the arm 220 and the ball 223 relative to the support structure 110. As shown in FIGS. 5 and 6, in some embodiments, the extension arm 243 have a cross-sectional shape, e.g., a hexagon, configured to engage with the profile 226, e.g., a receptacle or bore having a hexagonal cross-section shape, such that a portion of the extension arm 243 can be partially disposed within the profile 226 and extend therefrom. As show in FIG. 5, a retainer ring 245 can be disposed about the extension arm 243 and can be secured to the surface 225 defined by the ball 223. For example, the retainer ring 245 can be secured to the surface 225 via one or more fasteners 227. In some embodiments, an exterior surface of the extension arm 243 can include a shoulder or other profile that can extend outward that can engage with the retainer ring 245 to secure the extension arm 243 within the profile 226. In other embodiments, the extension arm 243 can be secured within the profile 226 via any other suitable manner, e.g., welding. In still other embodiments, the profile 226 can be a polygonal protrusion that can be integral with the ball 223.

In some embodiments, the mechanical joint 200 can also include a closure cap 240. In such embodiments, the closure cap 240 can define an aperture (not visible) therethrough. In some embodiments, the profile 226, e.g., the polygonal protrusion, can protrude or extend from the ball 223 and through the aperture defined by the closure cap 240. In some embodiments, the closure cap 240 can include a torque receptacle 241. In some embodiments, the torque receptacle 241 can be configured as a cylindrical structure that can define at least one slot 244 more typically two slots 244 or four slots 244 can be utilized as shown in FIG. 5. The torque receptacle 241 can be configured to interface with the tool. In some embodiments, the torque receptacle 241 can be an integral component of or fixedly attached or otherwise secured to the closure cap 240, such that when the tool engages with the profile 226 defined by the ball 233, the torque applied can be reacted against the toque receptacle 241 so that the torque can be directed toward the ball 223 to rotate the ball 223 and the arm 220 relative to the support structure 110. In some embodiments, the tool and the torque receptacle 241 can be designed or configured in accordance with American Petroleum Institute Specification 17H. In some embodiments, the tool can be hydraulically powered, pneumatically powered, and/or electrically powered. In some embodiments, when the mechanical joint 200 is disposed in an underwater application, the tool can be handled or operated by a diver or a remotely operated vehicle. In other embodiments, typically smaller applications in which the mechanical joint 200 is disposed above a water line, a manually operated torque tool, wrench, or socket wrench can be utilized to apply a torque to the ball 223 and arm 220.

In some other embodiments (not shown), the first end 221 of the arm 220 can define a surface. In some embodiments the surface of the first end 221 of the arm 220 can be substantially flat and normal to the longitudinal axis of the arm 224. In some embodiments, the profile 226 can be defined by the first end 221 of the arm 220 and the profile 226 can be a fastener, a bore, a polygonal protrusion, or a polygonal indentation. In such embodiments, the ball 223 can be configured such that the arm 220 can rotate relative to the ball 223 and the support member 110 about the longitudinal axis 224 of the arm 220. For example, the ball 223 can define a bore therethrough having an inner diameter and the arm 220 can have a first outer diameter or other outer perimeter located between the second end 222 and the ball 223 that can be greater than the inner diameter of the bore defined by ball 223. In such embodiment, the first end 221 of the arm 220 can be inserted into and through the bore defined by the ball 223 and the ball 223 can rest on the upper surface of the arm 220 that has the larger diameter or other outer perimeter than the inner diameter defined by the ball 223. The first end 221 of the arm 220 can be prevented from being removed from the ball 223 via a c-ring, a pin, or other fastener. In another example, the bore defined by the ball 223 can include one or more slots or other indentations and the outer diameter of the arm 220 about which the bore defined by the ball 223 can be disposed can include one or more fins or other corresponding extended surfaces that can matingly engage one another to prevent the arm 220 from rotating independently from the ball 223.

Figure 7:
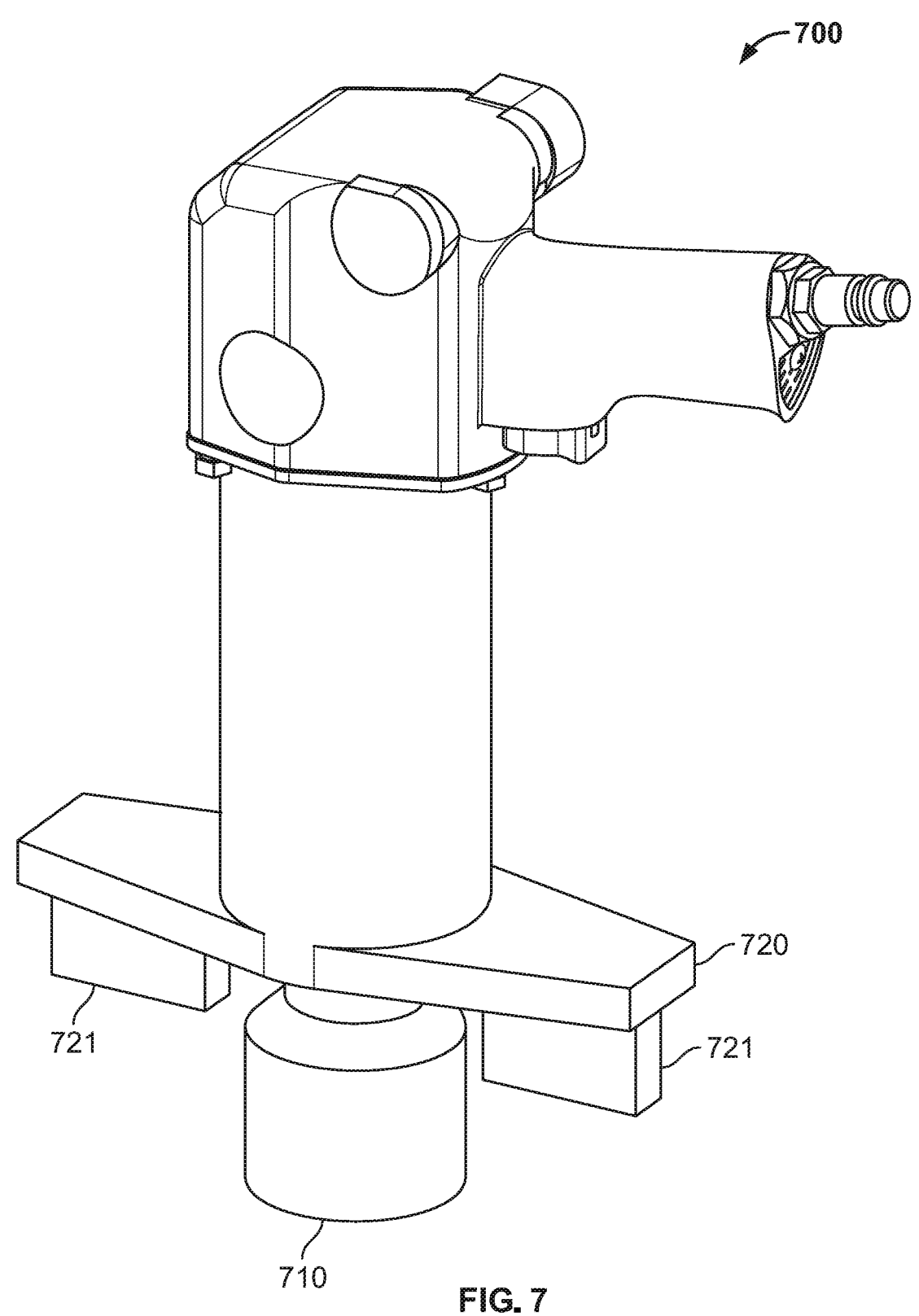
FIG. 7 depicts an illustrative tool, according to one or more embodiments described.

FIG. 7 depicts an illustrative tool 700, according to one or more embodiments. The tool 700 can be electrically, hydraulically, and/or pneumatically driven. In some embodiments, the tool 700 can have a rotating part 710 and a fixed part 720. The rotating part 710 of the tool 700 can be configured to interface or engage with the polygonal protrusion 243 shown in FIG. 5 or the profile 226 shown in FIG. 6 such that the rotating part 710 of the tool 700 can rotate the arm 220 and ball 223 In some embodiments, the fixed part 720 of the tool 700 can include at least one fin 721, two are shown. Each fin 721 can be configured to matingly engage with a corresponding slot 244 of the torque receptacle 241 such that the torque generated by the tool 700 can be reacted by the torque receptacle 241 such that the arm 220 and the ball 223 can be rotated relative to the support member 210. In some embodiments, when the mechanical joint 200 is disposed in an underwater application, the tool 700 can be handled or operated by a diver or a remotely operated vehicle.

Figure 8:
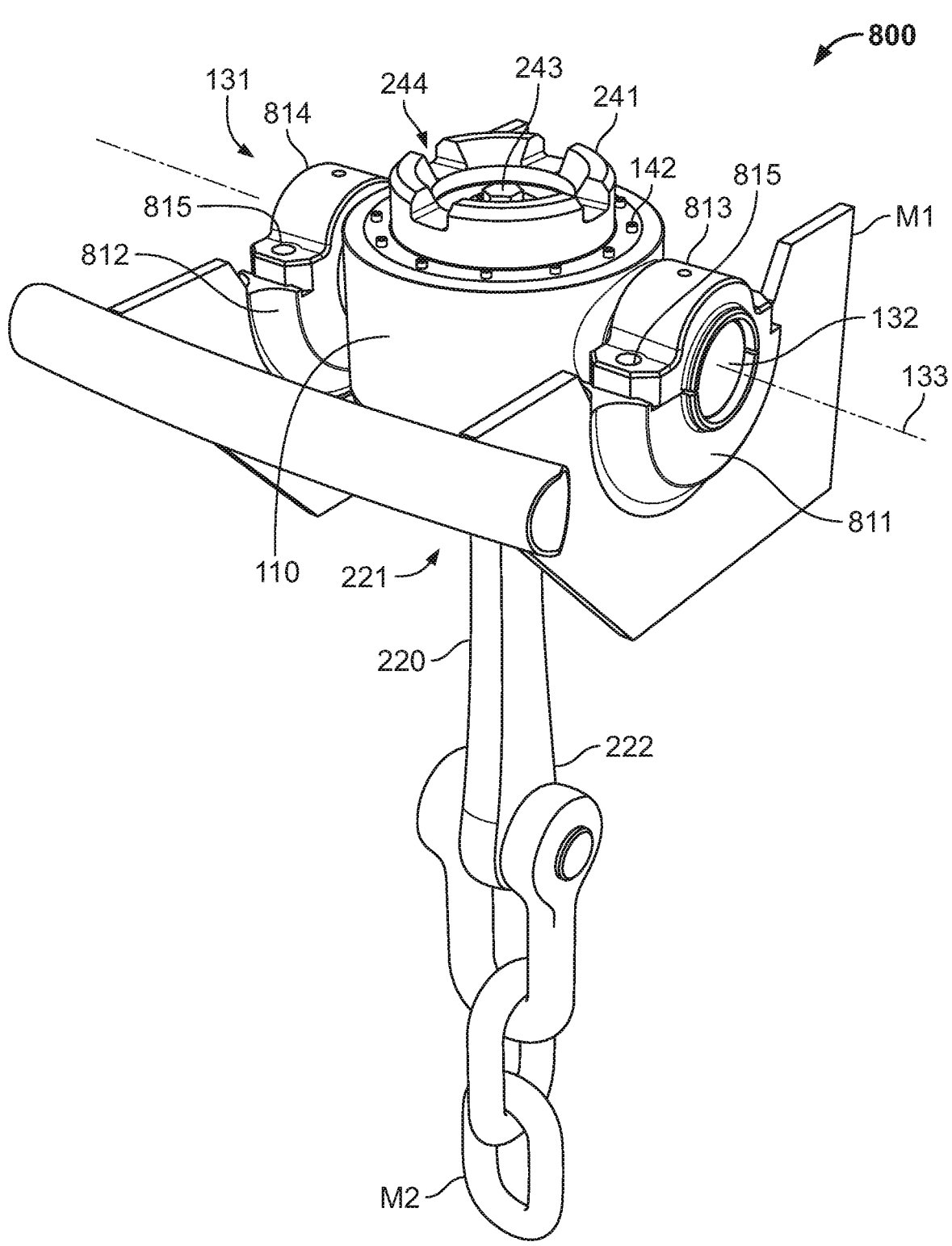
FIG. 8 depicts a perspective view of an illustrative assembly that includes the mechanical joint shown in FIG. 5 supported by a pair of bearing blocks disposed on a first member, according to one or more embodiments described.

FIG. 8 depicts a perspective view of an illustrative assembly 800 that includes the mechanical joint 200 supported by a pair of bearing blocks 811, 812 disposed on a first member M1, according to one or more embodiments. As shown in FIG. 8, in some embodiments the assembly 800 can include the mechanical joint 200 shown in FIG. 5 that can include the support member 110, the arm 220 having the first end 221 and the second end 222, the closure cap 240, and the pair of trunnions 131, 132. A second member M2, e.g., a chain, cable, rope, link arm, or other member or combination of members, can be connected to the second end 222 of the arm 220. It should be understood, in some embodiments, the assembly 800 can include the mechanical joint 100 described above.

In some embodiments, the trunnions 131, 132 can be connected to or disposed on and extend from an exterior surface of the support member 110 and axially aligned along the axis 133 of the support member 110, as described above. In some embodiments, the first member M1 upon which the bearing blocks 811, 812 can be disposed can be, but is not limited to, a floating structure or a stationary structure located in a body of water. In some embodiments, the floating structure can be, but is not limited to, a barge, a ship, a FPSO, a semisubmersible structure, a FSO, a FLNG, a FSRU, a wind platform, a buoy, drill ships, a tension-leg platform or any other floating structure. In some embodiments, the stationary structure located in a body of water can be, but is not limited to, a support tower fixed to a seabed, concrete/gravity platforms, jacket platforms, jack-up rigs, or any other structure. In some embodiments, the second member M2 can be, but is not limited to, a flexible or semi-flexible line, e.g., a mooring line, and/or a relatively rigid body, e.g., a link arm. In some embodiments, the flexible or semi-flexible line can be or can include a chain.

The trunnions 131, 132 can be configured such that the mechanical joint 200 can at least partially rotate about the axis 133 of the support member 110 relative to the first member M1. In some embodiments, the axis 133 of the support member 110 can be a centerline of the support member 110. The centerline can be defined as a line of symmetry of the support member 110 that bisects or is centered between a first side and a second side of the support member 110 that are opposed to one another, i.e., centrally located between two opposed sides of the perimeter and/or centrally located between a top/bottom of the support member 110. In some embodiments, the mechanical joint 200 can rotate up to +/−20 degrees, up to +/−40 degrees, or +/−up to 60 degrees relative to the first member M1.

In some embodiments, the first member M1 can include a pair of caps 813, 814 each of which can be fastened to a corresponding bearing block 811, 812, respectively. Each cap 813, 814 can be secured to the corresponding bearing block 811, 812 via one or more fasteners 815. The caps 813, 814 can be configured to permit the support member 110 to at least partially rotate relative to the first member M1 about the axis 133 of the support member 110.

In some embodiments, a process for rotating the second member M2 relative to the first member M1, where the second member M2 is connected to the first member M1 via a mechanical joint, e.g., the mechanical joint 200 can include deploying a tool, e.g., tool 700, to the mechanical joint 200. In some embodiments, the process can also include engaging the profile 226 defined by the ball 223 with the tool. The process can also include applying a torque to the ball 223 with the tool such that the ball 223 and arm 220 rotate relative to the support member 110. Such process can be used when, for example the second member M2 is a mooring leg and the mooring leg has a twist and it is desirable to remove the twist. The process can also include removing the tool from the mechanical joint 200. In some embodiments the tool can be operated by a diver or by a remotely operated vehicle.

The present disclosure further relates to any one or more of the following numbered embodiments:

A1. A mechanical joint configured to provide an articulated connection between a first member and a second member, comprising: a support member that defines an aperture therethrough and a socket on an inner surface thereof; and an arm comprising a ball disposed on a first end thereof engaged within and supported by the socket defined by the support member, wherein a second end of the arm extends through the aperture of the support member such that the arm can rotate relative to the support member about a longitudinal axis of the arm and at least partially rotate about two axes that pass through a center point of the ball that are perpendicular to one another and to the longitudinal axis of the arm.

A2. The mechanical joint of A1, wherein the ball defines a profile configured to receive a tool configured to apply a torque to the ball.

A3. The mechanical joint of A2, wherein the profile defined by the ball is a threaded cylindrical bore, a slot, a polygonal protrusion, a threaded cylindrical protrusion, or a polygonal indentation.

A4. The mechanical joint of A2 or A3, wherein the profile defined by the ball is a polygonal protrusion.

A5. The mechanical joint of A4, wherein the polygonal protrusion is an integral component of the ball or fixedly connected to the ball.

A6. The mechanical joint of A2 or A3, wherein the profile defined by the ball is a polygonal indentation.

A7. The mechanical joint of A6, further comprising an extension arm having a cross-sectional shape configured to be partially disposed within the polygonal indentation and extend therefrom, wherein the tool is configured to engage at least a portion of the extension arm extending from the polygonal indentation.

A8. The mechanical joint of any one of A2 to A7, wherein the tool is configured to be operated by a diver or a remotely operated vehicle.

A9. The mechanical joint of any one of A1 to A8, further comprising a pair of axially aligned trunnions disposed on an exterior surface of the support member.

A10. The mechanical joint of A9, wherein the pair of trunnions is configured to be supported by a pair of bearing blocks configured to be disposed on the first member such that the support member can at least partially rotate about an axis of the support member relative to the first member.

A11. The mechanical joint of A9, further comprising a pair of bearing blocks configured to be disposed on the first member and support the pair of trunnions such that the support member can at least partially rotate about an axis of the support member relative to the first member.

A12 The mechanical joint of any one of A9 to A11, further comprising a cylindrical bushing disposed about an outer surface of each trunnion of the pair of trunnions.

A13. The mechanical joint of A12, wherein each bushing is independently manufactured from a material comprising bronze, a polyethylene material, a composite material comprising polytetrafluorethylene, or a combination thereof.

A14. The mechanical joint of any one of A1 to A13, further comprising a bushing at least partially disposed between the ball and the socket defined by the support member.

A15. The mechanical joint of A14, wherein the bushing is manufactured from a material comprising bronze, a polyethylene material, a composite material comprising polytetrafluorethylene, or a combination thereof.

A16. The mechanical joint of any one of A1 to A15, further comprising a closure cap engaged with the ball, such that the ball is secured within the socket defined by the support member.

A17. The mechanical joint of A16, wherein: the ball defines a profile configured to receive a tool configured to apply a torque to the ball, and the closure cap defines an aperture therethrough configured to receive the tool therethrough, such that the profile defined by the ball can receive the tool.

A18. The mechanical joint of A16 or A17, wherein: the closure cap further comprises a torque receptacle, the profile defined by the ball is configured to engage with a rotating part of the tool, and the torque receptacle is configured to engage with a fixed part of the tool.

A19. The mechanical joint of A16 or A18, further comprising a bushing at least partially disposed between the closure cap and the ball.

A20. The mechanical joint of A19, wherein the bushing is manufactured from a material comprising bronze, a polyethylene material, a composite material comprising polytetrafluorethylene, or a combination thereof.

A21. The mechanical joint of any one of A16 to A20, wherein the closure cap defines a socket on an inner surface thereof such that the ball is secured within the socket defined by the support member and the socket defined by the closure cap.

A22. The mechanical joint of any one of A16 to A21, wherein the closure cap is configured to be secured to a first side of the support member with a plurality of fasteners.

A23. The mechanical joint of any one of A16 to A22, wherein a first end of the support member and an outer perimeter of the closure cap comprise helical threads configured to be threadedly engaged with one another to secure the closure cap to the support member.

B1. A mechanical joint configured to provide an articulated connection between a first member and a second member, comprising: a support member that defines an aperture therethrough and a socket on an inner surface thereof; an arm comprising a first end and a second end; and a ball connected to the arm toward or at the first end thereof, wherein the ball is engaged within and supported by the socket defined by the support member, and wherein the second end of the arm is configured to extend through the aperture defined by the support member such that the arm and ball can rotate about a longitudinal axis of the arm and at least partially rotate about two axes that pass through a center point of the ball that are perpendicular to one another and to the longitudinal axis of the arm.

B2. The mechanical joint of B1, wherein the first end of the arm defines a profile configured to receive a tool configured to apply a torque to the ball.

B3. The mechanical joint of B2, wherein the profile defined by the first end of the arm is a threaded cylindrical bore, a slot, a polygonal protrusion, a threaded cylindrical protrusion, or a polygonal indentation.

B4. The mechanical joint of any one of B1 to B3, further comprising a closure cap engaged with the ball, such that the ball is secured within the socket defined by the support member.

B5. The mechanical joint of B4, wherein the closure cap defines an aperture therethrough configured to receive the tool therethrough, such that the profile defined by the ball can receive the tool.

B6. The mechanical joint of B4 or B5, further comprising a bushing at least partially disposed between the closure cap and the ball.

B7. The mechanical joint of B6, wherein the bushing is manufactured from a material comprising bronze, a polyethylene material, a composite material comprising polytetrafluorethylene, or a combination thereof.

B8. The mechanical joint any one of B1 to B7, further comprising a pair of axially aligned trunnions disposed on an exterior surface of the support member.

B9. The mechanical joint of B8, wherein the pair of trunnions is configured to be supported by a pair of bearing blocks configured to be disposed on the first member such that the support member can at least partially rotate about an axis of the support member relative to the first member.

B10. The mechanical joint of B8, further comprising a pair of bearing blocks configured to be disposed on the first member and support the pair of trunnions such that the support member can at least partially rotate about an axis of the support member relative to the first member.

B11. The mechanical joint of any one of B8 to B10, further comprising a cylindrical bushing disposed about an outer surface of each trunnion of the pair of trunnions.

B12. The mechanical joint of B11, wherein each bushing is independently manufactured from a material comprising bronze, a polyethylene material, a composite material comprising polytetrafluorethylene, or a combination thereof.

B13. The mechanical joint of any one of B1 to B12, further comprising a bushing at least partially disposed between the ball and the socket defined by the support member.

B14. The mechanical joint of B13, wherein the bushing is manufactured from a material comprising bronze, a polyethylene material, a composite material comprising polytetrafluorethylene, or a combination thereof.

C1. A process for rotating a second member relative to a first member, wherein the second member is connected to the first member via a mechanical joint, the process comprising: deploying a tool to the mechanical joint, wherein the mechanical joint comprises: a support member that defines an aperture therethrough and a socket on an inner surface thereof; and an arm comprising a ball disposed on a first end thereof engaged within and supported by the socket defined by the support member, wherein a second end of the arm extends through the aperture of the support member such that the arm can rotate relative to the support member about a longitudinal axis of the arm and at least partially rotate about two axes that pass through a center point of the ball that are perpendicular to one another and to the longitudinal axis of the arm, and wherein the ball defines a profile configured to receive a tool; engaging the profile defined by the ball with the tool; and applying a torque to the ball with the tool such that the ball and arm rotate relative to the support member.

C2. The process of C1, further comprising disengaging the tool from the profile defined by the ball.

C3. The process of C1 or C2, wherein the tool is operated by a diver.

C4. The process of C1 or C2, wherein the tool is operated by a remotely operated vehicle.

C5. The process of any one of C1 to C4, wherein the mechanical joint further comprises a closure cap engaged with the ball, such that the ball is secured within the socket defined by the support member, and wherein the closure cap comprises a torque receptacle and defines an aperture configured to receive the tool therethrough such that the tool can engage with the profile defined by the ball to rotate the arm relative to the support member about the longitudinal axis of the arm.

C6. The process of C5, wherein the closure cap defines a socket on an inner surface thereof, and wherein the ball is secured within the socket defined by the support member and the socket defined by the closure cap.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim can be not defined above, it should be given the broadest definition persons in the pertinent art have given that term as reflected in at least one printed publication or issued patent. Furthermore, all patents, test procedures, and other documents cited in this application are fully incorporated by reference to the extent such disclosure can be not inconsistent with this application and for all jurisdictions in which such incorporation can be permitted.

While certain preferred embodiments of the present invention have been illustrated and described in detail above, it can be apparent that modifications and adaptations thereof will occur to those having ordinary skill in the art. It should be, therefore, expressly understood that such modifications and adaptations may be devised without departing from the basic scope thereof, and the scope thereof can be determined by the claims that follow.

What is claimed is:

1. A mechanical joint configured to provide an articulated connection between a first member and a second member, comprising:

a support member comprising a pair of axially aligned trunnions disposed on an exterior surface of the support member, wherein the support member defines an aperture therethrough and a socket on an inner surface thereof; and an arm comprising a ball disposed on a first end thereof engaged within and supported by the socket defined by the support member, wherein:

a second end of the arm extends through the aperture of the support member such that the arm can rotate relative to the support member about a longitudinal axis of the arm and at least partially rotate about two axes that pass through a center point of the ball that are perpendicular to one another and to the longitudinal axis of the arm, and the second end of the arm defines a bore therethrough that is configured to connect to the second member.

2. The mechanical joint of claim 1, wherein the ball defines a profile configured to engage with a rotating part of a tool that is configured to apply a torque to the ball.

3. The mechanical joint of claim 2, wherein the profile defined by the ball is a threaded cylindrical bore, a slot, a polygonal protrusion, a threaded cylindrical protrusion, or a polygonal indentation.

4. The mechanical joint of claim 2, wherein the tool is configured to be operated by a diver or a remotely operated vehicle.

5. The mechanical joint of claim 2, wherein, when the second end of the arm is connected to the second member and the torque is applied to the ball by the rotating part of the tool, the arm and the second member are configured to rotate with respect to the first member.

6. The mechanical joint of claim 1, wherein the pair of trunnions is configured to be supported by a pair of bearing blocks configured to be disposed on the first member such that the support member can at least partially rotate about an axis of the support member relative to the first member.

7. The mechanical joint of claim 1, further comprising a cylindrical bushing disposed about an outer surface of each trunnion of the pair of trunnions.

8. The mechanical joint of claim 7, wherein each bushing is independently manufactured from a material comprising bronze, a polyethylene material, a composite material comprising polytetrafluorethylene, or a combination thereof.

9. The mechanical joint of claim 1, further comprising a bushing at least partially disposed between the ball and the socket defined by the support member.

10. The mechanical joint of claim 9, wherein the bushing is manufactured from a material comprising bronze, a polyethylene material, a composite material comprising polytetrafluorethylene, or a combination thereof.

11. The mechanical joint of claim 1, further comprising a closure cap engaged with the ball, such that the ball is secured within the socket defined by the support member.

12. The mechanical joint of claim 11, wherein:

the ball defines a profile configured to engage with a rotating part of a tool that is configured to apply a torque to the ball, and the closure cap defines an aperture therethrough configured to receive the tool therethrough, such that the profile defined by the ball can engage with the rotting part of the tool.

13. The mechanical joint of claim 12, wherein the closure cap further comprises a torque receptacle configured to engage with a fixed part of the tool.

14. The mechanical joint of claim 1, wherein the bore defined by the second end of the arm is configured to connect to the second member via a shackle or an H-link connector.

15. A mechanical joint configured to provide an articulated connection between a first member and a second member, comprising:

a support member comprising a pair of axially aligned trunnions disposed on an exterior surface of the support member, wherein the support member defines an aperture therethrough and a socket on an inner surface thereof;

an arm comprising a first end and a second end; and a ball connected to the arm toward or at the first end thereof, wherein:

the ball is engaged within and supported by the socket defined by the support member, the second end of the arm is configured to extend through the aperture defined by the support member such that the arm and ball can rotate about a longitudinal axis of the arm and at least partially rotate about two axes that pass through a center point of the ball that are perpendicular to one another and to the longitudinal axis of the arm, and the second end of the arm defines a bore therethrough that is configured to connect to the second member.

16. The mechanical joint of claim 15, wherein the first end of the arm defines a profile configured to engage with a rotating part of a tool that is configured to apply a torque to the ball.

17. The mechanical joint of claim 16, wherein the profile defined by the first end of the arm is a threaded cylindrical bore, a slot, a polygonal protrusion, a threaded cylindrical protrusion, or a polygonal indentation.

18. The mechanical joint of claim 16, further comprising a closure cap engaged with the ball, such that the ball is secured within the socket defined by the support member, wherein the closure cap defines an aperture therethrough configured to receive the tool therethrough, such that the profile defined by the first end of the arm can engage with the rotating part of the tool.

19. A process for rotating a second member relative to a first member, wherein the second member is connected to the first member via a mechanical joint, the process comprising:

deploying a tool to the mechanical joint, wherein the mechanical joint comprises:

a support member comprising a pair of axially aligned trunnions disposed on an exterior surface of the support member, wherein the support member defines an aperture therethrough and a socket on an inner surface thereof; and an arm comprising a ball disposed on a first end thereof engaged within and supported by the socket defined by the support member, wherein:

a second end of the arm extends through the aperture of the support member such that the arm can rotate relative to the support member about a longitudinal axis of the arm and at least partially rotate about two axes that pass through a center point of the ball that are perpendicular to one another and to the longitudinal axis of the arm, the ball defines a profiled configured to receive the tool, the second end of the arm defines a bore therethrough that is connected to the second member, and a pair of bearing blocks is disposed on the first member that support the pair of trunnions such that the support member is at least partially rotatable about an axis of the support member relative to the first member;

engaging the profile defined by the ball with the tool; and applying a torque to the ball with the tool such that the ball and arm rotate relative to the support member.

20. The process of claim 19, wherein:

the mechanical joint further comprises a closure cap engaged with the ball, such that the ball is secured within the socket defined by the support member, the closure cap defines an aperture therethrough that is configured to receive the tool therethrough such that the tool can engage the profile defined by the ball, the closure cap comprises a torque receptacle configured to engage with a fixed part of the tool, and the process further comprises engaging the torque receptacle with the fixed part of the tool.

* * * * *